United States Patent Office 3,155,815
Patented Nov. 3, 1964

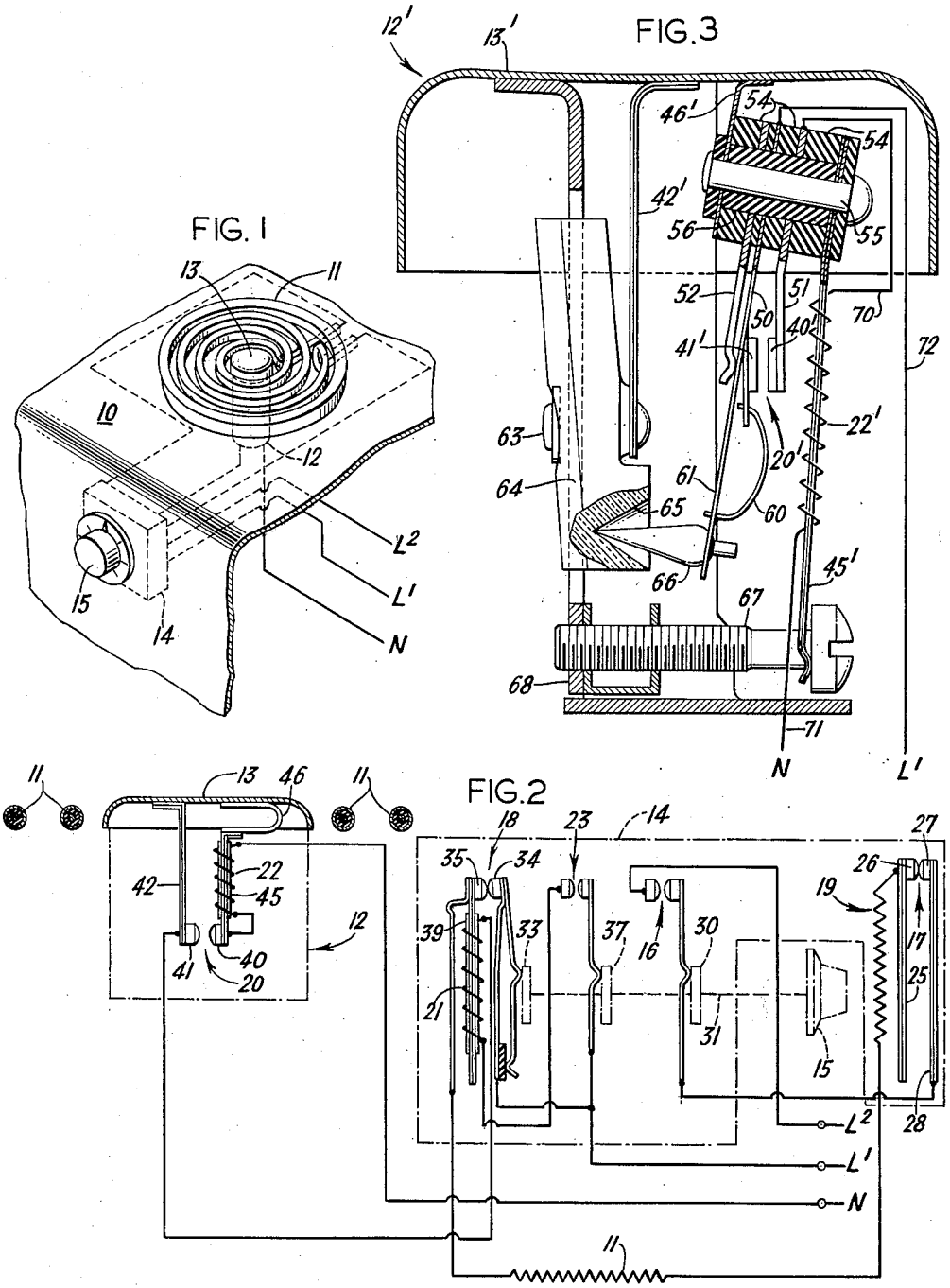

3,155,815
APPARATUS FOR CONTROL OF COOKING
TEMPERATURES
Daniel E. Clapp, Churchville, Pa., assignor to The Proctor-Silex Corporation, Philadelphia, Pa., a corporation of Connecticut
Filed Oct. 26, 1960, Ser. No. 65,088
6 Claims. (Cl. 219—508)

This invention relates to the control of cooking temperatures. It is concerned primarily with control of the heating units of an electric range and more particularly with the control of surface units on which cooking vessels are placed, adapted to heat such vessels rapidly and to maintain them at a substantially uniform preselected temperature.

In order to accomplish the desired initial rapid heating, provision is made for an initial energization of the heating unit at a rate in excess of its continuous wattage capacity. Subsequently interruption of the continuous wattage input is accomplished by a switch which is arranged so that it cycles to effect intermittent energization at an average value not in excess of its continuous wattage capacity. Additional means are provided, responsive to the temperature of a vessel placed on the heating unit, to maintain a selected temperature level of the cooking vessel.

U.S. Patent No. 2,817,741, issued December 24, 1957, to C. R. Turner describes one method of accomplishing this end, preferably utilizing a Bourdon tube, responsive to changes in temperature in a cooking vessel, to control the position of one contact of a current-operated cycling switch. Such a fluid expansion system limits to a certain extent the location that may be selected for the installation of the control switch. The present invention contemplates an all-electrical system in which the control switch may be located wherever desired. This invention also is an improvement over the invention of the above-mentioned patent in that the switch which is controlled by temperature responsive means associated with the cooking unit is separate from the current-operated thermally actuated switch which allows initial high rate energization and subsequently limits energization to the thermal capacity of the system. This separation of functions permits much greater flexibility in the choice of means for controlling the energization of the heating unit. It permits, for example, the use of a control whose action varies with the thermal capacity of the mass to be heated, as described in my copending application Serial Number 602,824, filed Aug. 8, 1956, now Patent No. 3,083,287.

The invention may be clearly understood by reference to the accompanying drawings illustrating certain embodiments in which:

FIG. 1 is a perspective view of a portion of an electric range schematically showing a surface unit to which the present invention has been applied;

FIG. 2 is a circuit diagram schematically representing switches and associated elements and their circuit connections that may be used in the practice of the invention with apparatus more generally illustrated in FIG. 1; and FIG. 3 is a view, partly in section, partly in elevation, of an alternate form of a switch useful as a portion of the apparatus.

Referring to FIG. 1, the electric range 10 to be controlled may employ one or more electric surface cooking units 11 which supply the cooking heat by their resistance. As shown surface cooking unit 11 is connected in the heating load circuit provided across power lines L1 and L2. Centrally mounted within the cooking unit 11 is detector unit 12 whose sensor cap 13 is positioned to make good thermal contact with a utensil placed on the cooking unit. Remotely located from the cooking unit 11 is a receiver unit 14 having a control knob 15 by which the cooking unit is energized and cooking temperatures of the utensil and its contents are controlled.

Heating unit 11 has a predetermined continuous wattage input rating, e.g. 1250 watts, and, in order to effect rapid initial heating of a cooking vessel placed on the heating unit, the voltage of the supply line is such, in relation to the resistance of the heating unit, as to effect substantial overenergization of that unit. By way of example, if the heating unit has a normal continuous rating of 1250 watts, the overenergization may be twice that value, or 2500 watts. Such overenergization is safely used for short intervals if the average wattage input is held by intermittent energization substantially to the normal capacity of the unit. The apparatus provided by this invention effects intermittent overenergization of the heating unit to provide a maximum average wattage input not greater than the normal continuous rating of the unit.

As shown in FIG. 2 heating unit 11 (shown both physically in proper location relative to detector 12 and schematically as an electrical resistance) is included in a load circuit across power lines L1 and L2 with on-off switch 16, energy limiting first switch 17 and temperature controlling switch 18 as well as a heater 19 associated with switch 17. A switch 20 in detector unit 12, which opens and closes in response to the temperature of the cooking utensil or vessel on the cooking unit 11, is arranged to control switch 18 through its associated heater 21 in series with switch 20 and a heater 22 associated with switch 20 as well as an on-off switch 23 across power lines L1 and N in a pilot circuit. Energy limiting switch 17 is preferably a cycling switch of a type known to the prior art as shown, for example, in Vogelsberg Patent No. 2,623,-137, issued December 23, 1952, having a composite thermally responsive member comprising a bimetallic element 25 carrying a switch contact 26 which cooperates with an opposed contact 27 to cause opening and closing of the controlled circuit. Mechanically interconnected with bimetallic element 25 is resistance heater 19 preferably in the form of a metal strip included in the energizing circuit with the cooking unit so as to be supplied with current when contacts 26 and 27 are closed. The bimetallic element 25 receives heat from the energized metal strip 19 and flexes to the left, as viewed in FIG. 2, to effect opening of the switch contacts, whereupon cooling of the metal strip permits the bimetallic element to cool, causing closure of the contacts. Such alternate heating and cooling thus results in opening and closing of switch 17 and the cyclic energization of heating unit 11. Use of a metal strip heater 19 serves additionally to augment the switching action by opening and closing the contacts quickly since it is thermally responsive to a lesser degree than bimetallic element 25 and its action due to expansion and contraction, is in the opposite direction. Contact 27 is preferably mounted on the free end of a compensating bimetallic member 28.

On-off switch 16 in circuit with the surface cooking unit 11 is controlled by cam 30 mounted on shaft 31 and movable to close or open the load circuit in response to the setting of control knob 15 at any "on" position. The control knob 15, when moved to any position in which it operates through cam 30 to close switch 16, will simultaneously operate cam 33, which acts to move contact 34 toward or away from some overclosed position with contact 35. The amount of overclosure or pressure resisting separation of the contacts 34 and 35 for a particular setting of control knob 15 is determined by the cam contour. The amount of overclosure of these contacts establishing the desired temperature setting positions of knob 15 may be accordingly calibrated.

Shaft 31 also carries a cam 37 which serves to close the contacts of an on-off switch 23 in a pilot circuit, similarly and simultaneously to closure of switch 16.

The arm of switch 18 which carries contact 35 is a bimetallic member 39 having its lower end fixed and its upper end free to move contact 35 toward or away from contact 34. In thermal association with bimetallic member 39, but electrically insulated therefrom, is the resistance heater 21 whose energization is controlled by switch 20 in detector 12 in response to heat derived from the cooking vessel. The bimetal of member 39 may be oriented to move contact 35 into engagement with contact 34 when heated, or it may be oriented to move contact 35 out of engagement with contact 34 when heated. For the first condition, the switch contacts in detector unit 12 are arranged to move to open position in response to increasing temperature, thereby deenergizing resistance heater 21. Subsequent cooling of bimetal 39 will separate contacts 35, 34 and deenergize cooking unit 11. For the second condition, the contacts of switch 20 in detector unit 12 are arranged to move to closed position in response to increasing temperature, thereby energizing resistance heater 21. Subsequent heating of member 39 will separate contacts 35, 34 and deenergize the heating unit. In the last-named case energization of heating unit 11 is initiated by a closure of contacts 35, 34 by means of cam 33. In both cases the cooking temperature required to open switch 18 will depend upon the pre-selected position of contact 34 in relation to contact 35 as determined by cam 33 as set by knob 15.

In the preferred arrangement, as described in my aforementioned Ser. No. 602,824, now Patent No. 3,083,287, detector unit 12 includes a switch 20 having contacts 40 and 41. Contact 41 is mounted on the lower end of a bimetallic member 42, which is in the form of a cantilever arm having its upper end secured in good heat-conducting relationship to the underside of a central, yieldably-mounted, metal disc 13 upon which the cooking vessel rests. In view of this excellent heat conductivity path, bimetallic member 42 will respond quickly to any increase in vessel temperature by flexing in a direction to move contact 41 to the right, since its high expansion side is on the left. The opposing contact 40 is mounted upon the free end of bimetallic member 45, which may be secured to the lower end of a U-shaped arm 46 of poor heat conductivity, interposed between the bottom of disc 13 and the upper end of bimetallic member 45. Arm 46 is preferably of high thermal inertia and may be made of ceramic material, stainless steel, or other material having the desired heat-transfer retarding properties. Thermally associated with bimetallic member 45, and electrically insulated therefrom, is the electric resistance heater 22 forming a part of the previously described pilot circuit which includes contacts 41, 40 and resistance heater 21.

Since the high expansion side of each of bimetallic members 42 and 45 is to the left, heat transmitted from the cooking vessel to bimetal 42 will move its free end to the right; i.e. in a direction to close the contacts, while heating of bimetal 45 will move it similarly to the right; i.e. in a direction to open the contacts. The high expansion side of bimetallic member 39, on the other hand, is to the right and heating of this member will accordingly move contact 35 of switch 18 to open position when this heating reaches a point sufficient to offset an initial overclosure of contact 35 against contact 34, as determined by the setting of knob 15.

While contacts 41, 40 may vary somewhat in their initial setting, it may be assumed that they are placed by initial calibration in a position in which they are in open position, having a slight degree of separation when at room temperature. They may actually be closed or they may be more widely seprated in the initial cold setting within the fundamental principles of operation.

In operation, starting with switch 20 open as suggested above and with a cooking vessel and contents placed on the cooking unit 11, knob 15 is turned to the desired temperature setting, thereby closing on-off switches 16 and 23 and overclosing switch 18 to an extent corresponding to the desired cooking vessel temperature. Switch 17 is normally closed so that the load circuit will thus be established as described above to heat the vessel and its contents. There will be a rapid initial heating of the cooking vessel for a short interval; e.g. an interval of one minute. The passage of current through heater 19 will cause bimetal 25 to flex and contacts 26 and 27 will open. After opening, heater 19 will cool rapidly reclosing of contacts 26 and 27, and cyclic action will proceed.

As the temperature in the cooking vessel rises, bimetallic element 42 will receive heat through disc 13 from the bottom of the vessel, and contacts 41, 40 of switch 20 will close when a predetermined vessel temperature is reached. The closure completes the pilot circuit from line L1 through switch 23, heater 21, switch 20, and heater 22 to line N, thereby heating both bimetallic members 45 and 39 and causing them to move toward positions tending to open their respective switches. Under most heating loads and temperature settings, bimetallic member 45 will be moved sufficiently to open switch 20 before bimetallic member 39 has been heated to a point sufficient to open switch 18. It should be noted that the cooking unit 11 will be cyclically energized in response to the operation of switch 17 until switch 18 opens.

As the temperature of the cooking vessel increases, contact 41 will move farther and farther to the right. When this results in closure of switch 20, contact 40 will move to the right as the result of the heating of its bimetallic member 45 by heater 22, and the energization of the pilot circuit through switch 20 will continue until contact 40 recedes sufficiently to escape its engagement with contact 41. In the meantime, contact 35 of switch 18 will have moved somewhat to the left under the heat derived from heater 21.

When switch 20 opens, contact 40 will move to the left as the result of cooling of bimetallic member 45. Contact 41 will continue to move to the right under the influence of the increasing temperature of the vessel. This contact movement will result in the reclosing of switch 20, as a result of which heater 22 will be energized causing bimetal 45 to move contact 40 to the right again and away from contact 41. This opening and closing of contacts 41 and 40 will repeat cyclically thereafter. Bimetallic member 39 will in this manner be progressively heated by intermittent energization of heater 21 until it flexes sufficiently to the left to open switch 18, thus temporarily interrupting the heating operation. This does not open switch 20 automatically, but it rapidly diminishes the movement of contact 41 to the right or reverses this movement, with the result that the pilot circuit is eventually interrupted. Interruption of the pilot circuit through heater 21 allows bimetallic member 39 to cool and again close the load circuit through switch 18. The load circuit will thereafter be intermittently opened and closed by the described interacting effect of heaters 21 and 22, cooking unit 11, and associated bimetallic members, whereby the desired vessel temperature is attained and maintained.

When bimetallic member 42 is receiving heat through disc 13 from the bottom of the vessel, bimetallic member 45 is also receiving heat through arm 46, but at a reduced rate because of the poor heat conductivity of arm 46. For this reason, when bimetallic member 42 is moving contact 41 to the right, bimetallic member 45 is also moving contact 40 to the right at a lesser rate. The distance that contact 40 moves before being overtaken by contact 41 depends on the rapidity with which contact 41 moves. This motion is relatively slow when a vessel of high thermal capacity is being brought up to a preselected temperature, while it is relatively rapid with a vessel of low thermal capacity. In the former case, the greater time required for bimetallic member 42 to reach a given temperature permits contact 40 to escape engagement with contact 41 for a longer time than in the latter case, resulting in the contact being in closed position a smaller percentage of the time. Therefore the greater the thermal capacity of the vessel and its contents the higher the temperature required before the initial opening of switch 18. This is exactly the relationship desired, for it is important, to prevent overshooting, to start the cycling of switch 18 with light cooking loads substantially below the preselected temperature, while with heavy cooking loads it is preferable, in the interest of rapid heating, to keep switch 18 closed until the preselected temperature is much more closely approached. With such heavier loads this can be done without incurring undesirable overshooting, since the control is responsive to the rate of temperature rise.

Switch 17 will open and close cyclically as long as switch 18 is in closed position, thereby providing an average wattage input to the heating unit whose value depends on the amount of initial pressure of contact 27 against contact 26. This pressure may be set by initial calibration at a point at which the average input equals the normal continuous rating of the unit. Such setting will prevent the average wattage input to cooking unit 11 from exceeding its continuous wattage capacity. Alternately the position of contact 27 may be made adjustable by cam or other selector means so that lower average inputs may be chosen for the lower heat ranges, to guard against initial overshooting of temperature.

When rising temperature in the cooking vessel causes the contacts of switch 18 to cycle between closed and open position, these interruptions to the current flow through heater strip 19 will reduce the heating effect on bimetal 25. As a result, contacts 26 and 27 will eventually remain continuously in closed position while switch 18 maintains the preselected temperature as determined by the setting of cam 33. Thus, in a sense, the control imposed initially by switch 17 is taken over or assumed by switch 18.

FIG. 3 illustrates a preferred form of detector unit 12'. This includes a snap-action switch 20', having contacts 41' and 40' mounted on the free end of switch blades 50 and 51. These blades; together with blade stop member 52 and blade bimetallic member 45' are spaced apart by electrical insulator discs 54. The blades and their insulators are securely bound together by bolt assembly 55 which is surrounded and insulated from the blades by insulator tube 56 which with the bolt passes through aligned openings in the blades and insulators. The blade assembly held together by bolt 55 is supported on disc 13' by means of a flexible arm 46' (corresponding to member 46), of poor heat conductivity such as stainless steel. Arm 46' is preferably connected to the blade assembly by the same bolt assembly which holds the blade together. The switch is of quick-break design, opening and closing contacts 40' and 41' with a snap-action through the overcenter action of bow-spring 60 whose opposite ends are secured to blade 50 and spring member 61, respectively. A second bimetallic member 42' has its upper end secured to disc 13' in good heat conducting relationship. Attached to its lower end, by means of a rivet 63, is a member 64 of porcelain or the like, having a relatively high mass. A conical recess 65 is formed in member 64. A conical link 66 has its small end seated in recess 65 and its large end engaging spring member 61, which is biased to the left.

The lower end of bimetallic member 45' is slotted to receive adjusting screw 67 which is threaded into mounting 68 on the frame of detector 12'. This screw is used for initial calibration, which is preferably accomplished by turning screw 67 out until the contacts just open. Such calibration is performed while the bimetallic members are at room temperature.

A resistance heater 22' is mounted in heat transfer relationship with bimetallic member 45'. One end of heater 22' is connected through conductor 70 to switch blade 51 and the other end of the heater is connected through conductor 71 to powerline N. Switch blade 50 is connected by means of conductor 72 through resistance heater 21' and switch 23 to powerline L1. This establishes the same pilot circuit as described in the first embodiment, switch 20' and heater 22' replacing switch 20 and heater 22.

The high expansion side of bimetallic member 42' is to the right, and the high expansion side of bimetallic member 45' is to the left. In operation, as the temperature of the cooking vessel rises, bimetallic member 42' will receive heat through disc 13' from the bottom of the cooking vessel and this member will move to the left. The rapidity of its motion being dampened by the heat-absorbing capacity of member 64. When a predetermined temperature is reached, this motion will carry the bow spring 60 overcenter and permit switch 20' to close with a snap-action. Such closure energizes the pilot circuit, as previously explained, thus heating both bimetallic member 45' and bimetallic member 39. Since bimetallic member 45' is restrained at its lower end by screw 67, its expansion will tend to rotate the whole assembly of blades in a clockwise direction by flexing arm 46'. This will permit bow-spring 60 to snap in the opposite direction, opening contacts 41' and 40'.

Where a three-wire source of electricity is not available, the system may be modified by connecting the pilot circuit between line L1 and line L2, using resistance heaters suitable for the supply voltage.

It will be obvious that in addition to the specific embodiments shown and described many variations of the specific structures and arrangement of the system are possible. For example, bimetals may be replaced by bellows or other thermomotive, thermally responsive members. Likewise, switch 17 may be located within the package of receiver unit 14 or outside of it. All such modifications within the scope of the claims are intended to be within the scope and spirit of the present invention.

I claim:

1. In an apparatus for controlling the operation of an electric surface cooking unit having a predetermined continuous wattage input capacity adapted to be connected to a power supply of such voltage as to produce a substantial overload of said unit if it is continuously energized, means for intermittently energizing said unit to maintain an average wattage input within its predetermined continuous wattage input capacity comprising a first switch having a pair of contacts in circuit with said unit, thermomotive means for opening and closing said contacts recurrently in response to heat from a resistance heater in heat-transfer relationship with said thermomotive means and in circuit with said contacts, a second switch having a pair of contacts in circuit with said unit and said first switch, and means responsive to the temperature of a vessel placed on said unit for opening and closing the contacts of said second switch while increasing the ratio of the time during which the contacts of said first switch are in engagement to the time during which they are in disengagement as said sensing means senses a higher vessel temperature.

2. An apparatus in accordance with claim 1 including manually adjustable means associated with one contact of said second switch to establish the temperature level of the cooking vessel.

3. An apparatus in accordance with claim 2 including manually adjustable means associated with one contact of said first switch to control the maximum average wattage input to the unit.

4. In an apparatus for controlling the operation of an electric surface cooking unit having a predetermined continuous wattage input capacity, means for initially supplying to said unit an input greater than its said capacity to effect initial rapid heating of the unit, means for subsequently interrupting said continuous wattage input and thereafter effecting intermittent energization of said unit to supply thereto a lower average wattage input than said initially supplied input, separate thermally operable switch means in series circuit with the cooking unit adapted to be initially in closed contact position, means for sensing temperature changes resulting from the operation of the heating unit, and means responsive to the rate of temperature rise for varying the temperature at which said thermally operable switch first opens in such manner that said switch opens at a lower temperature when controlling a cooking load of low thermal capacity then when controlling a cooking load of higher thermal capacity.

5. In an apparatus for controlling an electric cooking unit, a first switch connected in series circuit with said cooking unit, current-operable thermally responsive means arranged to open and close said switch recurrently, a second thermally operable switch in series circuit with said cooking unit adapted to be initially in closed contact position, means for sensing temperature changes resulting from the operation of the cooking unit, and means responsive to the rate of temperature rise for varying the temperature at which said second switch first opens in such manner that said switch opens at a lower temperature when controlling a cooking load of low thermal capacity than when controlling a cooking load of higher thermal capacity.

6. An apparatus in accordance with claim 5, including a cam means for adjusting and selecting the temperature of said cooking unit.

References Cited in the file of this patent
UNITED STATES PATENTS

| | | |
|---|---|---|
| 2,815,428 | Pearle | Dec. 3, 1957 |
| 2,816,203 | Weeks | Dec. 10, 1957 |
| 2,817,741 | Turner | Dec. 24, 1957 |
| 2,999,144 | Carissimi | Sept. 5, 1961 |
| 3,049,606 | Weeks | Aug. 14, 1962 |
| 3,070,684 | Turner | Dec. 25, 1962 |
| 3,072,773 | Clapp | Jan. 8, 1963 |
| 3,083,287 | Clapp | Mar. 26, 1963 |